United States Patent
Mori et al.

(10) Patent No.: US 6,464,877 B1
(45) Date of Patent: Oct. 15, 2002

(54) WATER TREATING METHOD

(75) Inventors: Yoshihiko Mori, Fuji; Yasujiro Fujii, Matsudo, both of (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/582,033

(22) PCT Filed: Nov. 5, 1998

(86) PCT No.: PCT/JP98/04980

§ 371 (c)(1),
(2), (4) Date: Jun. 21, 2000

(87) PCT Pub. No.: WO00/27756

PCT Pub. Date: May 18, 2000

(30) Foreign Application Priority Data

May 8, 1997 (JP) .............................................. 9-113291

(51) Int. Cl.$^7$ ............................. B01D 61/58; C02F 1/78
(52) U.S. Cl. ...................... 210/639; 210/650; 210/652; 210/663; 210/739; 210/806; 210/702; 422/28
(58) Field of Search ................................ 210/638, 639, 210/641, 650, 652, 760, 806, 739, 192, 202, 205, 663, 669, 702, 709; 422/28, 186.07

(56) References Cited

U.S. PATENT DOCUMENTS

| | | | | |
|---|---|---|---|---|
| 5,259,972 A | * | 11/1993 | Miyamaru et al. .......... | 210/760 |
| 5,271,830 A | * | 12/1993 | Faivre et al. | |
| 5,547,584 A | * | 8/1996 | Capehart ..................... | 210/760 |
| 5,645,727 A | | 7/1997 | Bhave et al. ................ | 210/650 |
| 5,679,257 A | * | 10/1997 | Coate et al. ................. | 210/760 |
| 5,711,887 A | * | 1/1998 | Gastman ...................... | 210/760 |
| 5,741,416 A | * | 4/1998 | Tempest ...................... | 210/192 |
| 5,766,488 A | * | 6/1998 | Uban et al. .................. | 210/739 |

FOREIGN PATENT DOCUMENTS

| | | |
|---|---|---|
| EP | 0 855 212 A1 | 7/1998 |
| JP | 230599 | 2/1987 |
| JP | 5-23688 | 2/1993 |
| JP | 256253 | 10/1995 |
| JP | 8-257377 | 10/1996 |
| JP | 11-277081 | 10/1999 |
| JP | 2000-107777 A | 4/2000 |

OTHER PUBLICATIONS

Mori et al., Desalination, NL, Elsevier Sci. Pub. Co., Amsterdam, vol. 117, No. 1–3, pp. 211–218, (1998).
Moulin et al., Proceedings of the 2$^{nd}$ International Conference on inorganic Membranes (ICIM2–91), pp. 229–236, (1991).

* cited by examiner

*Primary Examiner*—Joseph W. Drodge
(74) *Attorney, Agent, or Firm*—Birch, Stewart, Kolasch & Birch, LLP

(57) ABSTRACT

The present invention relates to a water treatment process comprising adding ozone to raw water and filtering the raw water using an ozone-resistant membrane, wherein a concentration of ozone present in the water filtered through the ozone-resistant membrane is detected and an amount of ozone to be fed into raw water is continuously and automatically controlled so as to adjust an ozone concentration to a prescribed value.

6 Claims, 5 Drawing Sheets

WATER TREATING METHOD

This application is the national phase under 35 U.S.C. § 371 of PCT International Application No. PCT/JP98/04980 which has an International filing date of Nov. 5, 1998, which designated the United States of America.

TECHNICAL FIELD

The present invention relates to an advanced treatment process of service water and secondary treatment waste water, and to a treatment of industrial water or waste water. More particularly, it relates to a membrane filtration treatment process of water using ozone that constantly and effectively provides a filtrate with a certain high quality.

BACKGROUND ART

A typical conventional water purification process is a coagulation sedimentation process. This process comprises first adding chlorine or sodium hypochlorite to collected raw water, oxidizing iron or manganese so as to make them insoluble and at the same time preventing microorganisms from increasing and from causing adverse effects in the purification process, then adding a coagulant appropriate to coagulate suspended substances, flocculating the coagulated substances for sedimentation separation, removing overflowed flocs by sand filtration, and cleansing the raw water. When the raw water contains few suspended substances, it may be treated according to a process comprising line-mixing coagulants followed by a sand filtration and a process comprising floating suspended substances by pressure.

However, it is impossible to achieve the water purification level required in the recent semiconductor industry and the protozoa removal level required in waterworks only by the conventional coagulation sedimentation processes. As the quality of raw water to be treated in waterworks has been debased year by year, there has been a demand, for example, to remove colored elements and elements having a foul odor and taste, to remove harmful organic substances such as agricultural chemicals and environmental hormones, to remove protozoas such as Cryptosporidium and Giardia, and to reduce chlorine disinfection by-products such as trihalomethanes. For satisfying such demands, advanced treatment such as biological treatment, treatment with ozone and treatment with activated carbon has been initiated.

Recently, membrane filtration processes using an ultrafiltration (UF) membrane and a microfiltration (MF) membrane have been adopted in smaller waterworks because of their advantages over the coagulation sedimentation process, such as a high ability to remove impurities, germs and protozoas sufficiently, high reliability and capability of automatic operation. Further, combinations of the membrane filtration treatment with the above advanced treatment are being studied.

However, the membrane filtration treatment requires regular cleansing of chemicals since continuous filtration causes clogging of the membrane so that a filtration flux gradually decreases. In order to reduce the frequency of cleansing of chemicals to as low as possible, it is necessary to carry out troublesome pretreatment such as coagulation sedimentation or to set the membrane filtration flux small. Therefore, its applicable field is limited by economic concerns. Further, according to the membrane filtration treatment, the protozoas contained in the raw water such as Cryptosporidium are completely removed so that the filtrate becomes safe. However, the condensed waste water produced by the membrane filtration contains concentrated protozoas, and therefore rigid oversight is required for the disposal of the waste water.

In order to avoid the above drawbacks, for instance, U.S. Pat. No. 5,271,830 and PCT International Patent Publication No. WO97/10893 disclose processes for preventing a membrane from clogging by feeding ozone upstream of the membrane and simultaneously improving water quality. However, for achieving sufficient effects in such a treatment, the ozone must be supplied excessively in anticipation of the change in the quality of the raw water. Therefore, these processes are economically disadvantageous. Further, the increase in the feeding amount of ozone unpreferably results in the formation of by-products and there is an increased load on the activated carbon in the following step, i.e., the use of activated carbon is increased by reacting with the ozone remaining in the filtrate.

On the other hand, a smaller feeding amount of ozone decreases the membrane filtration flux due to the clogging of the membrane. As a result, the water quality is not sufficiently improved. Moreover, if the raw water quality is changed, the membrane filtration flux is greatly fluctuated and the quality of the treated water is also fluctuated. Accordingly, it is difficult to ensure a certain amount of treated water with a certain quality all the time.

DETAILED DESCRIPTION OF THE INVENTION

An object of the present invention is to provide a process of membrane filtration treatment of water using ozone, wherein a filtrate having a certain high quality is obtained while a large filtration flux is maintained regardless of the fluctuation in the quality of raw water.

Another object of the present invention is to provide a process of membrane filtration treatment of water with ozone, wherein an amount of ozone remaining in the filtrate is kept small so as to conduct the following water treatment steps effectively.

A further object of the present invention is to provide a water treatment process, wherein treated water with a high quality is obtained using a compact system and harmful wastes are not produced.

The water treatment process of the present invention comprises adding ozone into raw water and filtering the raw water using an ozone-resistant membrane, wherein the concentration of ozone present in the water filtered through the ozone-resistant membrane is detected and an amount of ozone to be fed to the raw water is continuously and automatically controlled so that the concentration of ozone is adjusted to a prescribed value.

Embodiments of the water treatment process of the present invention as described above include:

a water treatment process comprising detecting a concentration of ozone present in the water filtered through an ozone-resistant membrane and controlling continuously and automatically an amount of the ozone to be fed to the raw water so that the concentration of ozone is adjusted to a prescribed value in the range of 0.05 to 1.0 mg/l;

a water treatment process, wherein the water filtered through the ozone-resistant membrane is further treated with activated carbon;

a water treatment process, wherein the water filtered through the ozone-resistant membrane is further treated using a reverse osmosis membrane;

a water treatment process, wherein, before the treatment with a reverse osmosis membrane, the filtrate is subjected to aeration or treatment with activated carbon, or sodium thiosulfate is added to the filtrate;

a water treatment process, wherein a coagulant is added to raw water prior to the filtration with an ozone-resistant membrane; and a water treatment process, wherein a pH value of the raw water is controlled to enhance the effect of the coagulant.

BEST MODE FOR CARRYING OUT THE INVENTION

The present invention relates basically to a water treatment process comprising adding ozone to raw water and filtering the ozone-containing water with an ozone-resistant membrane.

FIGS. 1 to 4 are water treatment flow diagrams showing embodiments of the present invention.

Figure 1:
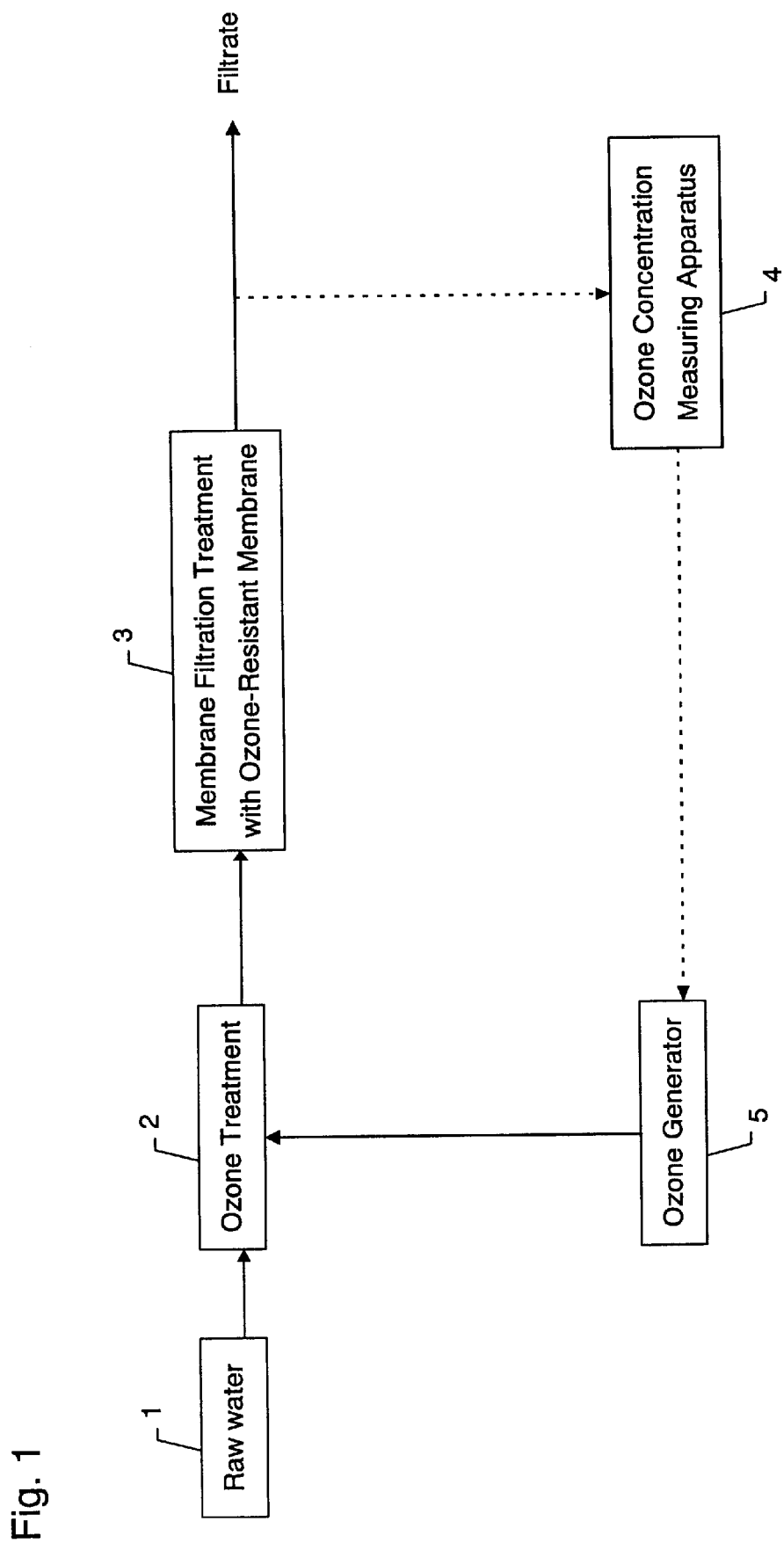
FIG. 1 shows a treatment flow of one of the embodiments of the present invention.

FIG. 1 shows a basic flow diagram comprising detecting an ozone concentration of water filtered through an ozone-resistant membrane using an ozone concentration measuring apparatus and automatically controlling an ozone amount generated by an ozone generator.

Figure 2:
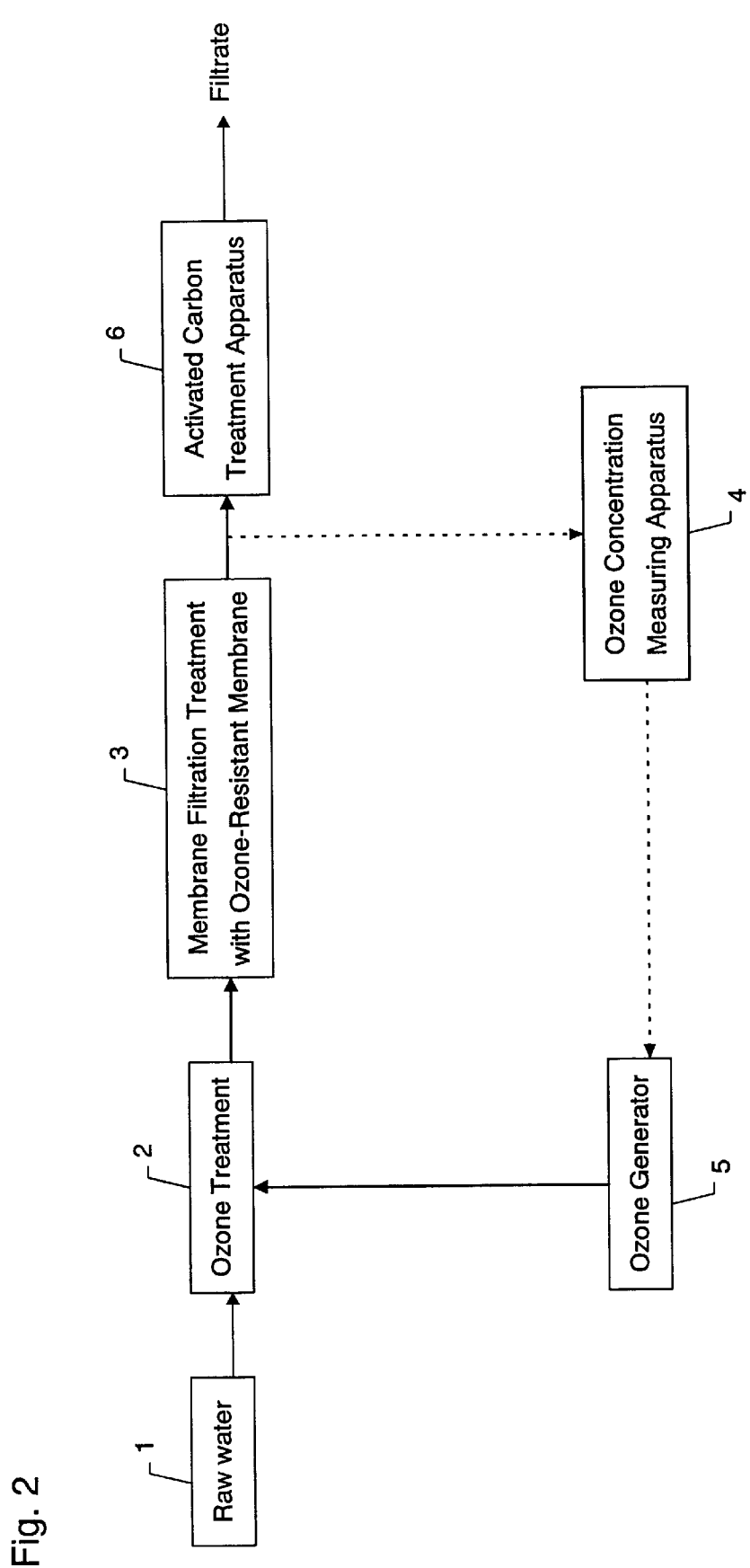
FIG. 2 shows a treatment flow of another embodiment of the present invention.

FIG. 2 shows a flow diagram, wherein an amount of ozone to be fed to raw water is controlled in the water treatment process wherein the water filtered through an ozone-resistant membrane is further treated using an activated carbon treatment device.

Figure 3:
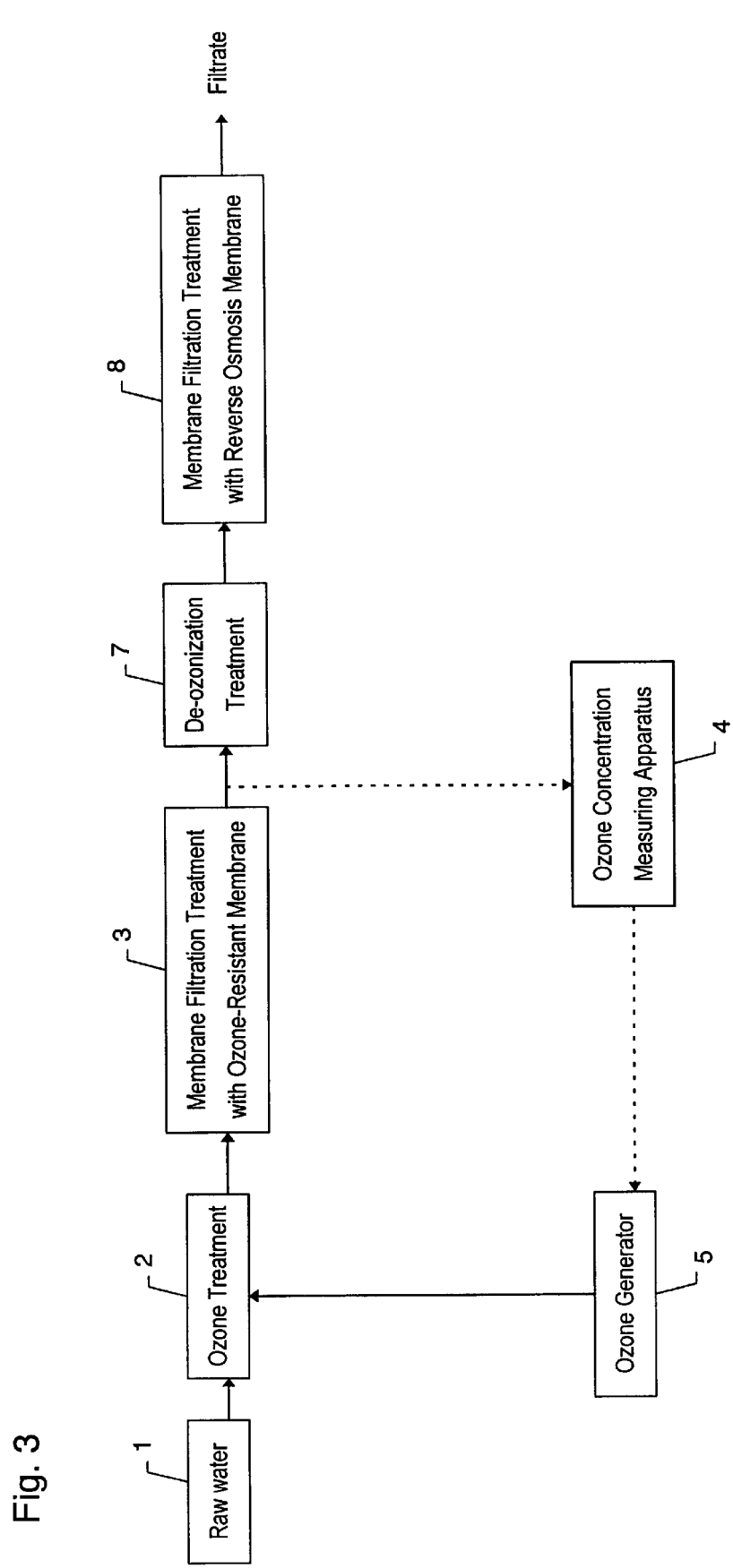
FIG. 3 shows a treatment flow of a further embodiment of the present invention.

FIG. 3 shows a flow diagram, wherein an amount of ozone to be fed to raw water is controlled in the water treatment process wherein the water filtered through an ozone-resistant membrane is further treated with a reverse osmosis membrane.

Figure 4:
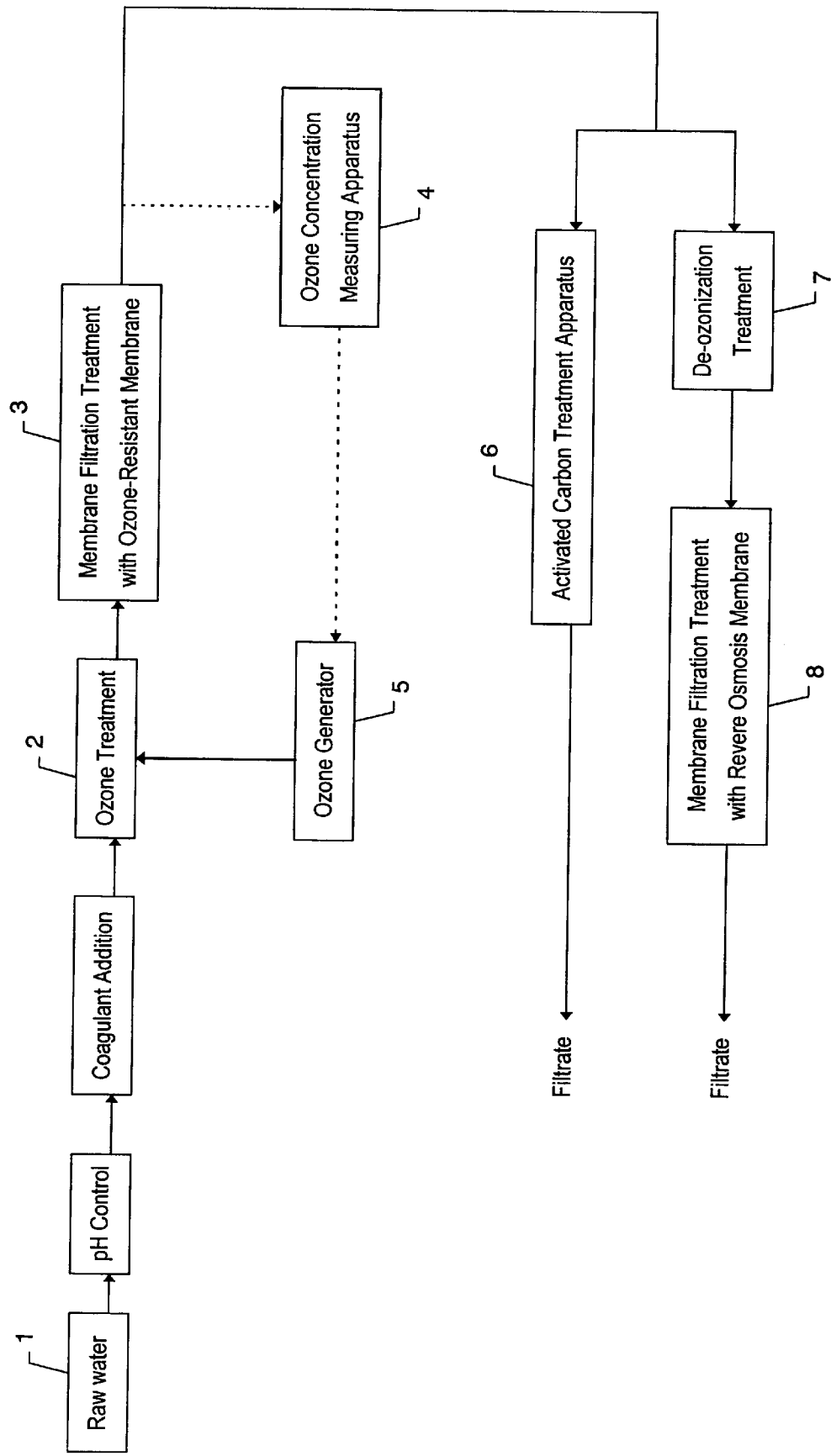
FIG. 4 shows a treatment flow of yet another embodiment of the present invention.

FIG. 4 shows a flow diagram, wherein a coagulant is added to raw water in the process of treating water with activated carbon as shown in FIG. 2 or in the process of treating water using a reverse osmosis membrane as shown in FIG. 3.

The term "raw water" used in the present invention means water which is subjected to the advanced treatment of service water and secondary treatment waste water and the waste water treatment, e.g., river water, lake water, marsh water, ground water, reservoir water, secondary treatment waste water, industrial waste water and the like.

Conventionally, if raw water as above exemplified is filtered with a membrane as it is, suspended substances contained in the raw water and organic substances being larger than the pore diameter of the membrane is blocked at the membrane so that a so-called concentration polarization or a cake layer is formed and, at the same time, the organic substances in the raw water clog the membrane or attach to the netting constructed inside of the membrane. As a result, the membrane filtration flux upon filtering raw water is decreased to between 1 in several and 1 in several tens of that upon filtering pure water.

However, if the above raw water is filtered through a membrane in the presence of oxidizing agents such as ozone, it passes through the membrane while decomposing the organic substances attaching to or clogging the membrane so that an extremely large filtration flux can be achieved. Namely, in the presence of ozone, ozone repeatedly attacks the organic substances attached to the filtration membrane when passing through it. This means that the membrane always carries out self-cleansing during the filtration. As a result, a large filtration flux can be obtained.

By adding ozone to raw water, there can be expected effects such as improvement of water quality, i.e., removal of color and foul odor and taste, and effective removal of iron and manganese during membrane filtration, which is brought by oxidization thereof, besides the effect that a large filtration flux is obtained as above described. In the present invention, it is necessary to add ozone in such an amount that achieves the above effects at the same time.

Although an amount of ozone added to enhance the water quality depends on the nature of the raw water and the purpose of water quality improvement, it is added in an amount so that the ozone concentration is 0.05 to 30 mg/l. An excessive amount of ozone causes many by-products due to the oxidative destruction by ozone so that the load at the following step of absorbing by-products becomes unpreferably large or manganese in the raw water is not effectively removed during membrane filtration because of peroxidization thereof. In addition, such excessive ozone is not advantageous in economy since ozone increasingly remains. On the other hand, too small an amount of ozone cannot improve the water quality sufficiently.

The relation between the amount of ozone fed into raw water and the membrane filtration flux also depends on the quality of raw water. The present inventors have found that even if the same amount of ozone is fed into the same raw water, the membrane filtration flux differs depending on whether or not ozone remains on the surface of a filtration membrane, and that the filtration flux becomes larger in the case that ozone remains on the surface of the filtration membrane since the membrane surface is cleansed all the time.

Figure 5:
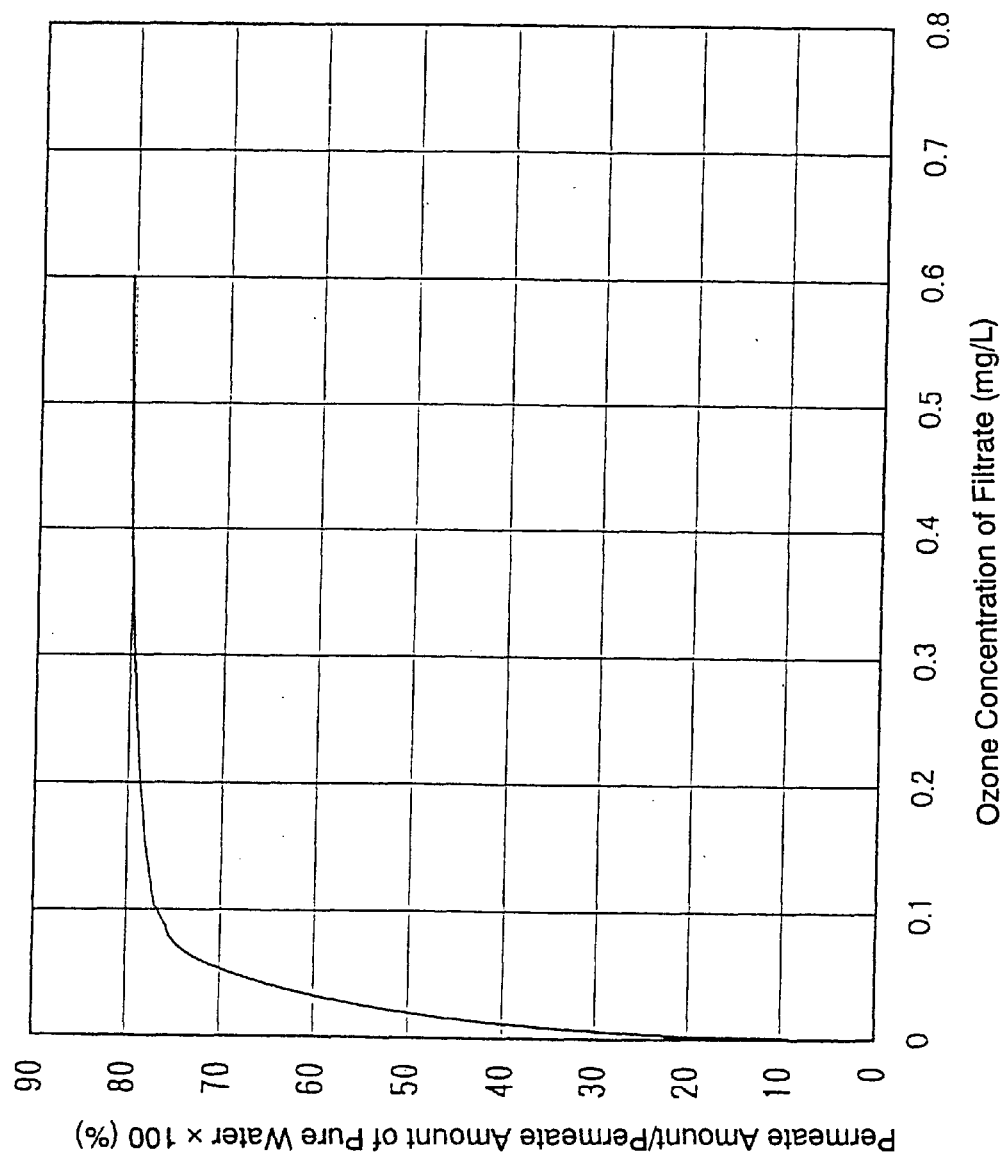
FIG. 5 is a graph showing a relation between an ozone concentration of water filtered through an ozone-resistant membrane and a membrane filtration flux in Example 1.

Then, the present inventors made studies on the relation between the ozone concentration and the membrane filtration flux under the condition that ozone remains in the raw water (i.e., on the surface of the filtration membrane). As a result, they discovered that the ozone concentration and the membrane filtration flux are in the relation as shown in FIG. 5. Namely, when the amount of the residual ozone in filtrate is 0.3 mg/l or more, the membrane filtration flux is almost constant. When it is less than 0.05 mg/l, the membrane filtration flux greatly depends on the ozone concentration of the filtrate and changes sharply.

In other words, it has been found that when the ozone concentration of filtrate is 0.3 mg/l or more, further increase of the membrane filtration flux cannot be expected, and that when the ozone concentration of filtrate is less than 0.05 mg/l, it is difficult to obtain the filtrate in a constant amount due to considerable changes in the membrane filtration flux.

On the other hand, the present inventors also found that if ozone is fed into raw water so that the ozone concentration of filtrate falls in the range of 0.05 mg/l or more and less than 1.0 mg/l, water quality is sufficiently improved.

Considering the above facts, for the purpose of achieving a necessary and sufficient ozone treatment effect according to the filtration process comprising adding ozone to raw water and filtering it with an ozone-resistant membrane, the amount of ozone fed into raw water is controlled so that the concentration of ozone present in filtrate is a prescribed value in the range from 0.05 to 1 mg/l, preferably in the range from 0.05 to less than 0.3 mg/l.

Hereinafter, each step of the process is described in more detail.

Control of Ozone Amount

The present invention has a feature that an amount of ozone to be fed into raw water is continuously and automatically controlled so that the ozone concentration of filtrate is a prescribed value when raw water is filtered through an ozone-resistant membrane after the addition of ozone.

As shown in the flowcharts of FIGS. 1 to 4, raw water 1 is treated by ozone in step 2 of ozone treatment and is filtered through an ozone-resistant membrane in step 3. The ozone concentration of the water filtered through the membrane is measured by the ozone concentration measuring apparatus 4 all the time. Based on the measured values, the amount of ozone supplied from an ozone generator 5 in the ozone treatment step is automatically controlled so that the concentration of the residual ozone falls in, for example, the range from 0.05 to less than 0.3 mg/l.

As the ozone concentration measuring apparatus 4, a ultraviolet absorbance method, an electrode method, an iodometric method, an indigo blue method, a fluorescence method, a coloring method and the like can be employed. Among them, a method wherein feedback control is exercised with high accuracy in a short time is preferable. The ultraviolet absorbance method and the electrode method are preferable since they can arithmetically calculate a measured value. The measured value by the ozone concentration measuring apparatus 4 is computed with a CPU (central processing unit) and transmitted to the ozone generator 5. In the ozone generator 5, a concentration of ozone to be generated is increased or decreased by means of controlling current or voltage of the apparatus according to the transmitted signal.

Ozone Treatment

In the step 2 of ozone treatment, the ozone to be added to raw water may be in the form of ozone units or ozonized air. The ozone can be introduced into raw water through an air diffuser tube and the like installed in a reaction column arranged in front of a raw water vessel or an air diffuser tube and the like arranged at an appropriate position in a raw water vessel. Instead of the reaction column equipped with the air diffuser tube, a U-tube system can be also employed.

Further, in addition to the above supplying systems, ozone may be fed from an ejecting or line-mixing system which is set in the middle of a tube introducing raw water to the ozone-resistant membrane.

When ozone is generated by electrical discharge, the raw material for generating ozone may be either air or oxygen. Further, ozone generated by electrolysis of water is acceptable. Preferably, ozone is supplied into raw water continuously.

By the addition of ozone, microorganisms inhabiting the raw water 1 such as virus, bacteria, mold and protozoa can be killed. Further, the suspended substances or organic substances in the raw water 1 are decomposed by the ozone, and at the same time, the raw water containing ozone is filtered while decomposing the organic substances attaching to or clogging the ozone-resistant membrane described below. As a result, an extremely large filtration flux can be achieved. Namely, since the organic substances adhering to the membrane is repeatedly attacked by the ozone passing through the membrane, the membrane always self-cleanses throughout the filtration so that a large filtration flux can be obtained.

Although special attention is not necessary regarding the contacting period of the raw water 1 and ozone, it is generally 1 second to 30 minutes.

Membrane Filtration Apparatus

The filtration apparatus used in the present invention should be equipped at least with a vessel or tank for reserving raw water (hereinafter referred to as a raw water vessel), a membrane module, means for transferring raw water to the membrane module (e.g., circulation pump, etc.), a vessel or tank for reserving water filtered through a membrane (hereinafter referred to as a filtrate tank), and means for backwashing the membrane. In the case of a cross-flow filtration system, a line for returning raw water not passing through the membrane (circulating water) to the raw water vessel is arranged.

Membrane Filtration Treatment with Ozone-Resistant Membrane

An ozone-resistant membrane to be used in the present invention is not particularly restricted as long as it is not ruined by ozone. For example, there can be employed inorganic membranes such as ozone-resistant ceramic and organic membranes such as fluorine type resin membranes, e.g., a polyvinylidene fluoride (PVDF) membrane, a polytetrafluorinated ethylene (PTFE) membrane, an ethylene-tetrafluoroethylene copolymer (ETFE) membrane, and a polyfluoroacrylate (PFA) membrane. In particular, the polyvinylidene fluoride (PVDF) membrane is preferably employed.

Among the above ozone-resistant membranes, one with pore diameters ranging from those suitable for an ultrafiltration (UF) membrane to those suitable for a microfiltration (MF) membrane can be used. Basically, a microfiltration (MF) membrane with a high filtration rate is preferably used. For example, a membrane with an average pore diameter of preferably 0.01 to 1 $\mu$m, more preferably 0.05 to 1 $\mu$m, is suitably used.

The ozone-resistant membrane is shaped optionally in a hollow yarn, a plain membrane, pleats, a spiral, a tubular and the like. Of these, a hollow yarn shaped membrane is preferable since membrane area per unit volume is large. In general, the filtration is carried out in a module installing a membrane.

The filtration may be carried out according to either a whole quantity filtration method or a cross-flow filtration method. In the case of the cross-flow filtration method, air or oxygen contained in the supplied ozone gas is returned to the raw water vessel together with the circulating water and is separated into gas and liquid. On the other hand, in the case of the whole quantity filtration method, it is necessary to remove ozonized air existing as unreacted gas in the raw water chamber of the membrane module. Some devices to, for instance, arrange a vapor-liquid separation apparatus in the upper part of the membrane module must be invented.

Further, either a pressure filtration method or a negative pressure filtration method is employed. The pressure filtration method is more preferable since a larger filtration flux can be obtained. Either internal pressure or external pressure filtration method is employed.

In order to maintain filtration performance of the membrane, the membrane module is regularly subjected to physical cleansing. As the physical cleansing, backwashing and air-scrubbing are mainly effective.

The backwashing is preferably carried out using the water filtered through the ozone-resistant membrane.

The air-scrubbing comprises stopping filtration after operation for a certain period, feeding a gas on the surface of the membrane facing the raw water, and vibrating the membrane surface to cleanse the membrane. In the present invention, since the organic substances attaching to the membrane surface is decomposed by ozone to be non-attaching substances, the non-attaching substances (organic and inorganic substances) clogging the pores of the membrane are effectively shaken off by the air-scrubbing. Therefore, great cleansing effects can be achieved.

The air-scrubbing may be combined with the backwashing. They may be conducted in the order of filtration, air-scrubbing and then backwashing; filtration, backwashing and then air-scrubbing; or filtration and then simultaneously air-scrubbing and backwashing.

Further, the air-scrubbing may be conducted either with or without running raw water at the same time. Or, the air-scrubbing and backwashing may be conducted alternately.

The air-scrubbing is preferably conducted for 1 second to 6 minutes. When its operation period is less than 1 second, the effect of the air-scrubbing cannot be exhibited. On the other hand, when it is more than 6 minutes, a pause of the filtration is prolonged so that an amount of filtrate is unpreferably reduced.

Activated Carbon Treatment

In the flowchart of FIG. 2, the activated carbon treatment apparatus 6 is an apparatus for removing a very small amount of organic substances contained in the water filtered through the ozone-resistant membrane, biologically easily decomposable organic substances produced by the reaction with ozone or by-products produced by the reaction with ozone to produce highly treated water. Specifically, the activated carbon treatment comprises introducing water filtered through the ozone-resistant membrane into a tank containing granular activated carbons and carrying out post-treatment.

As the activated carbon, biological activated carbon (BAC) is preferably used. The BAC is particularly effective to remove biologically easily decomposable organic substances produced by the reaction of humin and the like with ozone.

When the activated carbon treatment is conducted, it is important to control the ozone concentration of the water filtered through the ozone-resistant membrane at a low level for the following reasons. If the ozone concentration in the filtrate is high, the activated carbons react with ozone. As a result, oxygen gas is generated and an air lock phenomenon is caused, so that water filtration resistance increases or water cannot be filtered. The ozone concentration of over 1.0 mg/l considerably causes such phenomena. A high ozone concentration puts a greater load on the activated carbon in the activated carbon treatment step. In such a case, there is the possibility that microorganisms in the biological activated carbons may be killed by ozone. The ozone concentration in the filtrate is in the range of preferably from 0.05 to 1.0 mg/l, more preferably 0.05 to less than 0.3 mg/l, most preferably from 0.05 to 0.25 mg/l.

De-ozonization Treatment

In the membrane filtration treatment with a reverse osmosis membrane as shown in the flowchart of FIG. 3, it is desirable to de-ozonize the filtrate prior to the membrane filtration treatment 8 with a reverse osmosis membrane for the purpose of protecting the reverse osmosis membrane which does not have a resistance to ozone. For example, the de-ozonization treatment comprises arranging a residence tank and carrying out aeration to remove ozone from the filtrate, or carrying out treatment with a reducing agent such as sodium thiosulfate or activated carbons to decompose residual ozone.

Membrane Filtration Treatment with Reverse Osmosis Membrane

When water is treated with a reverse osmosis membrane, a treatment process comprising coagulation sedimentation and sand filtration treatment and the like are generally performed as a pre-treatment for removing suspended substances. According to these methods, it is possible to reduce the content value, i.e., the fouling index (FI) value, of suspended substances contained in the water subjected to the pre-treatment of the filtration with a reverse osmosis membrane to 3 or less. Such a value, however, is not sufficient enough.

According to the water treatment with an ozone-resistant membrane, which the present invention proposes, the FI value can be 1 or less since suspended substances and microorganisms in the raw water 1 are blocked by the ozone-resistant membrane. Therefore, in the case that the water filtered through the ozone-resistant membrane is further treated with a reverse osmosis membrane as shown in the flowchart of FIG. 3, filtrate with uniform quality can be constantly transferred to the reverse osmosis membrane regardless of the changes in quality, amount and temperature of the raw water 1. Accordingly, no load is put on the reverse osmosis membrane, performance of the treatment is sufficiently maintained and a large filtration flux can be obtained. A reverse osmosis membrane facility can be downsized. Further, as the supply pressure can be lowered, the energy cost becomes low.

Since the water treatment process of the present invention is structured based on the filtration with an ozone-resistant membrane, a filtration flux becomes large and the filtration is carried out very effectively. As a result, the cost of the whole facility can be reduced.

The membrane filtration treatment 8 with the reverse osmosis membrane can, for example, remove organic substances with high hydrophilicity such as polysaccharide which are not digested by microorganisms and are difficult to attach to the activated carbons according to the biological activated carbon treatment. Further, when the water temperature is lowered in the biological activated carbon treatment, the biological activity is reduced and treatment performance is deteriorated. However, the use of a reverse osmosis membrane provides the advantage of less dependency on temperature.

The type of the reverse osmosis membrane is not particularly limited. A low-pressure reverse osmosis membrane and a nano-filter can be used besides common reverse osmosis membranes. If the low-pressure reverse osmosis membrane and the nano-filter, which are suitable for low pressure treatment, are used, a filtration operation pressure can be increased so that a filtration flux is preferably enlarged.

The reverse osmosis membrane can obstruct soluble organic substances, micro-pollutants such as agricultural chemicals, and inorganic salts. Therefore, it is effective to obtain drinking water or industrial water from highly contaminated raw water or raw water having a high salt concentration.

Addition of Coagulant

When a membrane having a pore diameter encompassed within a microfiltration (MF) area, particularly a membrane having a large pore diameter, is used for the filtration with an ozone-resistant membrane, suspended substances (SS), bacteria and the like contained in the raw water 1 invade in the membrane. Particularly, the membrane clogging caused by highly viscous substances is extremely difficult to wash off by means of a common membrane filtration operation.

For the membrane filtration using a microfiltration (MF) membrane with a large pore diameter, coagulants such as polyaluminum chloride (PAC), aluminum sulfate, ferrous chloride and ferric chloride are preferably added to the raw water. A flowchart in the case of using coagulants is exemplified in FIG. 4.

The coagulant may be added in a reservoir tank such as a tank for reserving the raw water 1, or in the middle of a tube transferring the raw water 1 to a chamber where ozone is added, or may be added by means of line-mixing method in the middle of a tube transferring the raw water 1 to the ozone-resistant membrane after the addition of ozone.

For the purpose of further improving the effects of the coagulant, the pH value of the raw water may be controlled to desired levels by liquid chemicals and the like. An appropriate pH value differs depending on the type of the coagulant. It is adjusted so as to be in the range of 2 to 8, preferably 2 to 7.5 before, during or after the addition of the coagulant.

The liquid chemicals for adjusting the pH value are added according to the same manner as used for the addition of the coagulants (e.g., addition to the raw water tank and line-mixing addition) prior to or simultaneously with the addition of the coagulants. The pH value is suitably adjusted by mineral acids such as hydrochloric acid, sulfuric acid and nitric acids when the raw water is alkaline, and by sodium hydroxide, potassium hydroxide or the like when the raw water is acid.

If a coagulant is used together with the liquid chemicals, organic suspended substances or polymeric substances are coagulated and are unlikely to contact with ozone. As a result, it can be expected to halve the necessary amount of ozone.

The coagulants need to be added in such an amount that is capable of coagulating the suspended substances contained in the raw water 1. In general, such an amount is preferably 1 to 100 mg/l, more preferably 2 to 50 mg/l of the raw water 1.

Hereinafter, the Examples of the present invention is described.

EXAMPLE 1

Present Invention

As the raw water 1, river surface water with turbidity of 3 to 4 degrees, chromaticity of 5 to 10 degrees, COD (chemical oxygen demand) of 6 to 8 mg/l, and water temperature of 12° C. was employed. As shown in FIG. 1, water treatment was carried out in the sequence of raw water 1→ozone treatment 2→membrane filtration 3 with an ozone-resistant membrane. The ozone concentration of the water filtered through the ozone-resistant membrane was measured with an ozone concentration measuring apparatus 4. In order to keep the ozone concentration at a prescribed value, an amount of ozone generated from an ozone generator 5 is automatically increased or decreased by a CPU.

As an ozone-resistant membrane used for the membrane filtration treatment 3 with an ozone-resistant membrane, a microfiltration (MF) membrane in the form of a PVDF (polyvinylidene fluoride) hollow fiber with an average pore diameter of 0.1 μm, which was prepared according to Japanese Patent Application Laid-Open No. 3-215535 was employed. The module used was an external pressure type module comprising installing a bundle of 1,800 PVDF hollow fiber membranes with an internal diameter of 0.7 mm and an external diameter of 1.25 mm in a PVC (polyvinyl chloride) casing with a diameter of 3 inches. When a membrane area was 7.0 $m^2$ and a module filtration pressure was 50 kPa, a pure water flux was 1.8 $m^3$/hr.

For the filtration, the cross-flow system was employed. The raw water 1 was fed into a raw water vessel, and was further supplied to the above-described PVDF hollow fiber module at a constant incoming pressure with a pump to carry out constant pressure filtration. The amount of circulation water was controlled so that the ratio of the filtrate amount to the circulation water amount may be 1 to 1.

Between the exit of the pump and the module, an ejector type ozone supply port was arranged. Ozone produced using air as a raw material was fed therefrom.

The treatment was carried out by repeating an operation comprising 10 minute filtration followed by 15 second backwashing with filtrate. During the treatment, air-scrubbing was carried out for 120 seconds every 12 hours by supplying air in an amount of 2 $Nm^3$/hr from the bottom of the module.

The value of a signal controlling an amount of ozone to be generated, which was transmitted from the ozone concentration measuring apparatus 4 to the ozone generator 5, was set so that the ozone concentration of the water filtered through the ozone-resistant membrane was a prescribed value. Then, the above filtration treatment was performed for 50 hours. A membrane filtration flux after 50 hours was measured, and was divided with the pure water flux obtained under the same filtration pressure. The result shown in FIG. 5 was obtained.

The filtrate was analyzed. As a result, it was found that when the ozone concentration of the filtrate was 0.05 mg/l or more, the turbidity was 0.02 degrees, the chromaticity was 2 degrees or less and colon bacillus or general bacteria were not detected at all. On the other hand, when the ozone concentration of the filtrate was less than 0.05 mg/l, the turbidity was 0.02 degrees, and neither colon bacillus nor general bacteria were detected, but the chromaticity was 5 to 7 degrees.

EXAMPLE 2

Present Invention

In Example 1, the operation was carried out so as for the ozone concentration of the filtrate to be 0.2 mg/l, and the filtrate was transferred to an activated carbon vessel (see the flowchart of FIG. 2). As the activated carbon, F400 manufactured by Calgon Co., Ltd. was employed. The operation was designed so as for the EBCT (Empty Bed Contact time) to be 20 minutes.

As a result, the water quality analysis, the water filtered through the ozone-resistant membrane had a turbidity of 0.02 degrees, a chromaticity of 2 degrees or less, and a COD of 4 to 5.5 mg/l. Further, the quality of the water passed through activated carbon was a turbidity of 0.02 degrees, a chromaticity of 1 degree or less, and a COD of 0.3 to 0.8 mg/l.

EXAMPLE 3

Present Invention

As the raw water 1, secondary treatment waste water having a turbidity of 5 to 11 degrees, a chromaticity of 18 to 20 degrees, a COD of 20 to 30 mg/l, a pH value of 7.2 to 7.6, and a temperature of 23° to 25° C. was employed. As well as Example 1, the raw water was treated in the sequence of raw water 1→ozone treatment 2→membrane filtration 3 with ozone-resistant membrane as shown in FIG. 1. The operation was designed so that the ozone concentration of the water filtered through the ozone-resistant membrane was 0.25 mg/l.

The quality of the filtrate was a turbidity of 0.1 degree or less, a chromaticity of 2 degrees or less, and a COD of 6 to 8 mg/l. Further, when a part of the filtrate was collected and residual microorganisms were detected according to a provisional examination method for detecting agar mediums and *Cryptosporidium oocyst*, the existence of such microorganisms was not confirmed at all.

A part of the concentrated water was also collected and examined. The existence of dangerous residual and alive microorganisms was not detected. The concentrated waste water was also confirmed to be safe.

EXAMPLE 4

Present Invention

Using the same raw water and ozone-resistant membrane module as in Example 3, the water treatment process with the reverse osmosis membrane as shown in FIG. 4 was carried out. Namely, the raw water was treated in the sequence of raw water 1→pH control 9→addition of coagulant 10→ozone treatment 2→membrane filtration 3 with ozone-resistant membrane. A part of the obtained filtrate was subjected to the de-ozonization treatment 7 and then was subjected to the membrane filtration treatment 8 with a reverse osmosis membrane.

The pH value was controlled so as to be 6.2 to 6.5 by arranging a static mixer on a line transferring raw water to a raw water tank (which is not shown in the figure) in the membrane filtration apparatus using an ozone-resistant membrane and adding sulfuric acid thereto. Further, between the static mixer and the raw water vessel, another static mixer was arranged to add ferric chloride ($FeCl_3$) as a coagulant in an amount of 35 mg/l of the raw water. Then, an ozone treatment was carried out.

The ozone concentration of the water filtered through an ozone-resistant membrane was detected using the ozone concentration measuring apparatus 4, and was controlled so as to be 0.05 mg/l by automatically decreasing or increasing the ozone amount generated from the ozone generator 5 through a CPU.

The quality of the water filtered through the ozone-resistant membrane had a turbidity of 0.1 degree or less, a chromaticity of 1 degree or less, and a COD of 4 to 6 mg/l.

The de-ozonization treatment was carried out by adding sodium thiosulfate in an amount of 0.15 mg/l of raw water to the water filtered through an ozone-resistant membrane and decomposing residual ozone.

Next, a part of the resultant treated water was supplied to an aromatic polyamide type compound membrane spiral nano-filter. The aromatic polyamide type composite membrane spiral nano-filter had a NaCl blocking rate of 65%, $MgCl_2$ blocking rate of 50% and sucrose blocking rate of 99%.

The above-mentioned aromatic polyamide type composite membrane spiral nano-filter was arranged into two-step cascade, and was driven for 2 months at a filtrate recovery rate of 70% under a filtration pressure of 40 kPa. The operation was constantly carried out all through, and a filtration amount of 5 $m^3$/day was obtained. In addition, a TOC (total organic carbon) removal rate was kept at 90 to 97% throughout the operation. The quality of the resultant treated water was high enough for subjecting to reuse.

EXAMPLE 5

Present Invention

Using the raw water employed in Example 1, the filtration was carried out according to the whole quantity filtration system under a constant pressure. Namely, water was supplied to the raw water vessel in the same amount as the filtrate, and a vapor-liquid separation apparatus was arranged at the upper part of the membrane module. The ozone addition method, ozone-resistant membrane employed and operation conditions were the same as Example 1.

The operation was carried out so as for the ozone concentration of the filtrate to be 0.25 mg/l. As a result, the value obtained by dividing the membrane filtration flux after 50 hour operation with the pure water flux under the same membrane filtration pressure was 79%, which was the same value as the cross-flow system filtration. Further, the quality of the filtrate was the same as the cross-flow system filtration. No difference was observed between the whole quantity filtration system and the cross-flow filtration system.

Industrial Applicability

According to the present invention, filtrate with a certain high quality can be constantly produced in the process of membrane filtration treatment of water using ozone while maintaining a large filtration flux regardless of changes in the quality of raw water.

Further, according to the present invention, the amount of ozone remaining in the filtrate can be kept small during the process of membrane filtration treatment of water using ozone so that the following water treatment can be carried out effectively.

Furthermore, according to the present invention, treated water with a high quality is obtained in a compact system, and a water treatment process without producing harmful wastes can be achieved.

Consequently, according to the present invention, treated water with a good quality can be economically and constantly produced in the advanced treatment of service water and secondary treatment waste water, treatment of industrial water or waste water, and the like.

What is claimed is:

1. A water treatment process comprising adding ozone to a raw water and filtering the raw water using an ozone-resistant membrane, wherein a concentration of ozone present in water filtered though the ozone-resistant membrane is detected and an amount of ozone fed to the raw water is continuously and automatically controlled so as to adjust the concentration of ozone in the filtrate to a prescribed value, and wherein the amount of the ozone fed to the raw water is adjusted so that the concentration of ozone present in the filtrate is at said prescribed value, which prescribed value is in the range of 0.05 to 0.3 mg/l.

2. The water treatment process according to claim 1, wherein the filtrate is further treated with activated carbon.

3. The water treatment process according to claim 1, wherein the filtrate is further treated with a reverse osmosis membrane.

4. The water treatment process according to claim 3, wherein, before the treatment with the reverse osmosis membrane, the filtrate is subjected to aeration or treatment with activated carbon, or sodium thiosulfate is added to the filtrate to remove residual ozone.

5. The water treatment process according to claim 1, wherein a coagulant is further added to the raw water.

6. The water treatment process according to claim 5, wherein, before, after or at the same time as the addition of the coagulant, a pH value of the raw water is adjusted to 2 to 8.

* * * * *

UNITED STATES PATENT AND TRADEMARK OFFICE
CERTIFICATE OF CORRECTION

PATENT NO.    : 6,464,877 B1
DATED         : October 15, 2002
INVENTOR(S)   : Yoshihiko Mori et al.

It is certified that error appears in the above-identified patent and that said Letters Patent is hereby corrected as shown below:

<u>Title page, Item [54] and Column 1, line 1,</u>
Please correct the title from "WATER TREATING METHOD" to -- MEMBRANE FILTRATION TREATMENT PROCESS OF WATER USING OZONE --.

<u>Title page,</u>
Item [30], delete Item [30], Foreign Application Priority Data, in its entirety.

Signed and Sealed this

Twenty-ninth Day of April, 2003

JAMES E. ROGAN
*Director of the United States Patent and Trademark Office*